United States Patent [19]
Lieb et al.

[11] Patent Number: 5,950,365
[45] Date of Patent: Sep. 14, 1999

[54] MOTOR-DRIVEN WINDOW LIFTER WITH ELECTRONIC ENTRAPMENT PROTECTION FOR A MOTOR VEHICLE

[75] Inventors: Hans-Dieter Lieb, Grub am Forst; Andre Eberlein; Michael Friedrich, both of Coburg; Jürgen Seeberger, Baunach, all of Germany

[73] Assignee: Brose Fahrzeuteile GmbH & Co. KG, Coburg, Germany

[21] Appl. No.: 08/854,808

[22] Filed: May 12, 1997

[30] Foreign Application Priority Data

May 10, 1996 [DE] Germany ............... 196 18 853

[51] Int. Cl.$^6$ ............... E05F 15/02
[52] U.S. Cl. ............... 49/28; 49/352
[58] Field of Search ............... 49/26, 28, 352, 49/348, 349

[56] References Cited

U.S. PATENT DOCUMENTS

| | | | |
|---|---|---|---|
| 2,324,145 | 7/1943 | Floraday | 49/26 |
| 2,400,572 | 5/1946 | Parsons | 49/28 |
| 4,199,899 | 4/1980 | Muhling et al. | 49/352 |
| 4,631,864 | 12/1986 | Barros et al. | 49/352 |
| 4,970,827 | 11/1990 | Djordjevic et al. | 49/349 |
| 5,461,826 | 10/1995 | Heckel et al. | 49/28 |
| 5,469,656 | 11/1995 | Gier et al. | 49/28 |
| 5,477,641 | 12/1995 | Heckel et al. | 49/28 |
| 5,523,679 | 6/1996 | Kalb | 324/165 |
| 5,564,230 | 10/1996 | Periou | 49/349 |
| 5,577,347 | 11/1996 | Heckel et al. | 49/28 |

FOREIGN PATENT DOCUMENTS

| | | |
|---|---|---|
| 0604272 | 6/1994 | European Pat. Off. . |
| 2584469 | 1/1987 | France . |
| 2693535 | 1/1994 | France . |
| 3438255 | 6/1986 | Germany . |
| 3925864 | 2/1991 | Germany . |
| 4015774 | 7/1991 | Germany . |

OTHER PUBLICATIONS

"Dictionary of Scientific and Technical Terms", McGraw–Hill, p. 185.

*Primary Examiner*—Jerry Redman
*Attorney, Agent, or Firm*—Christie, Parker & Hale, LLP

[57] ABSTRACT

A motor-driven window lifter for a motor vehicle with electronic means to protect against entrapment of body parts in the window opening with at least one spring in the line of force between the drive unit (such as an electric motor or gear) and the window pane is characterized in that the blocking force of the spring corresponds at a maximum to the sum of the displacement force anticipated and the admissible entrapment force and that the spring characteristic when an initial load is exceeded has a decreasing, preferably negative curve, such that the spring enables a relatively long path of the drive unit when the initial load is exceeded.

17 Claims, 6 Drawing Sheets

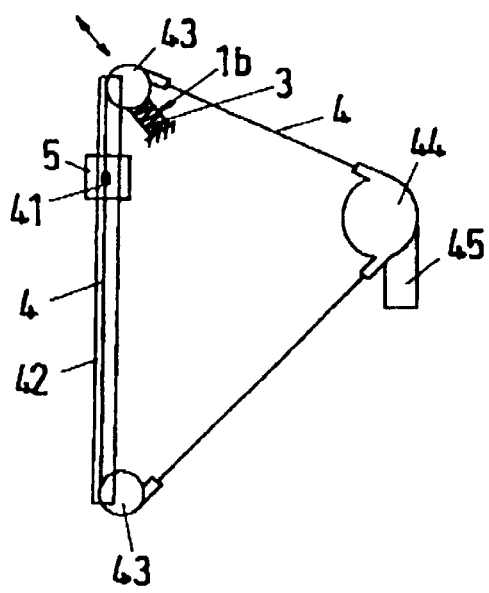
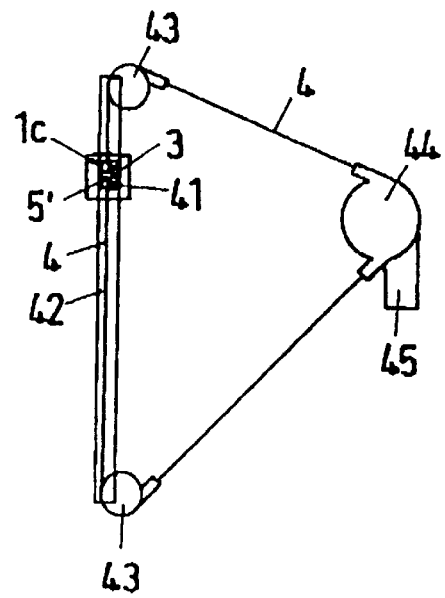
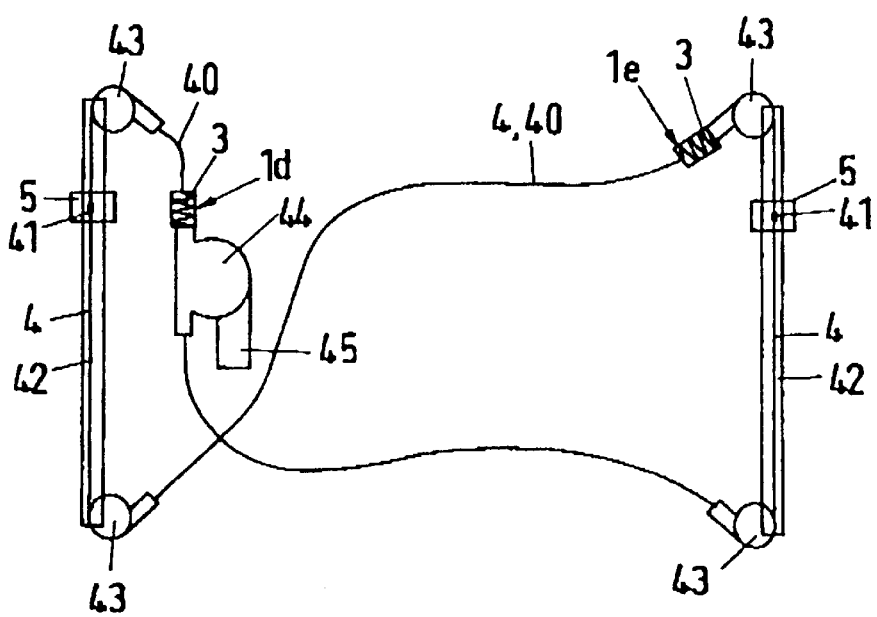

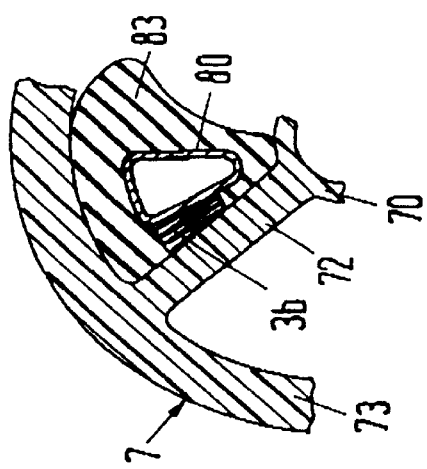
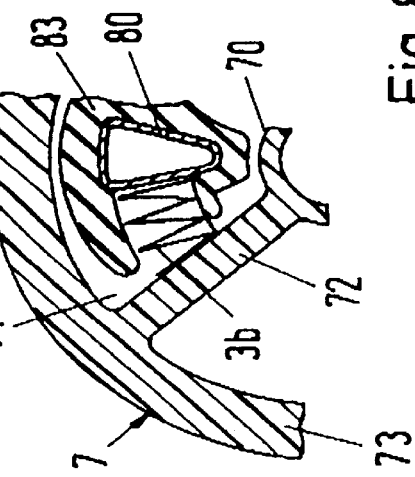
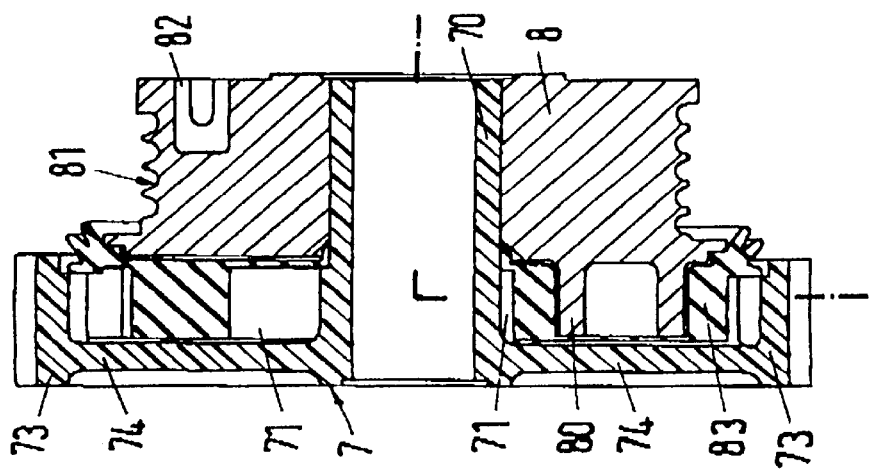

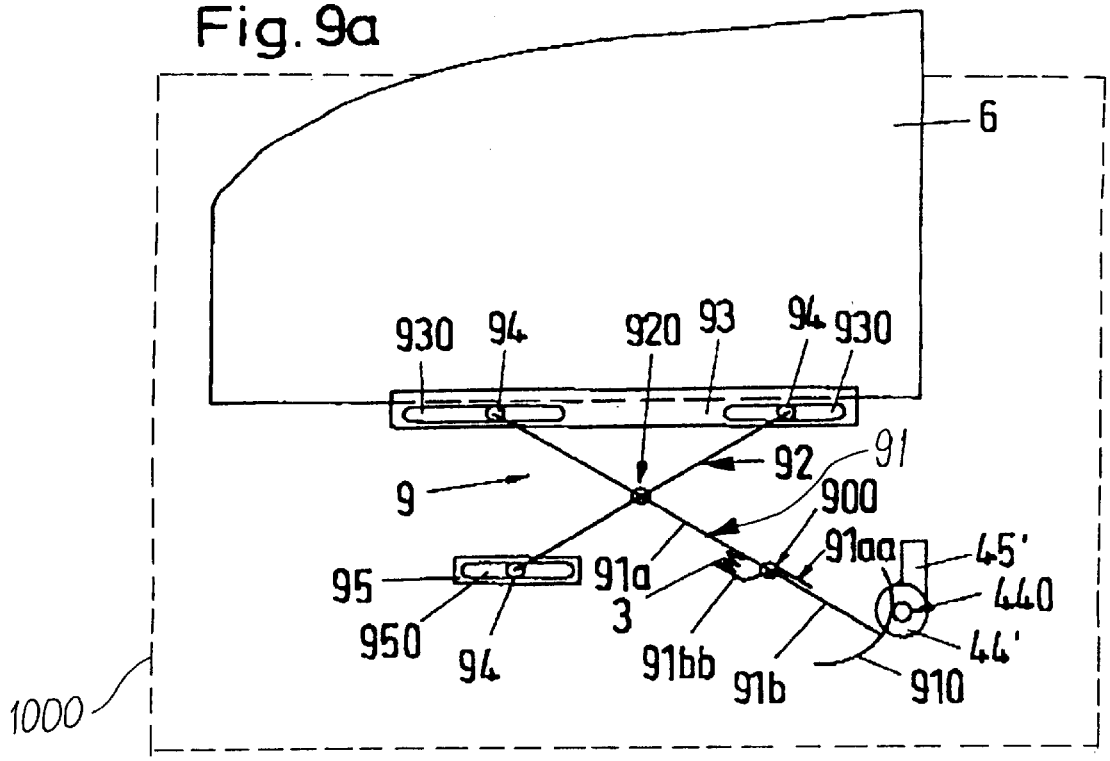
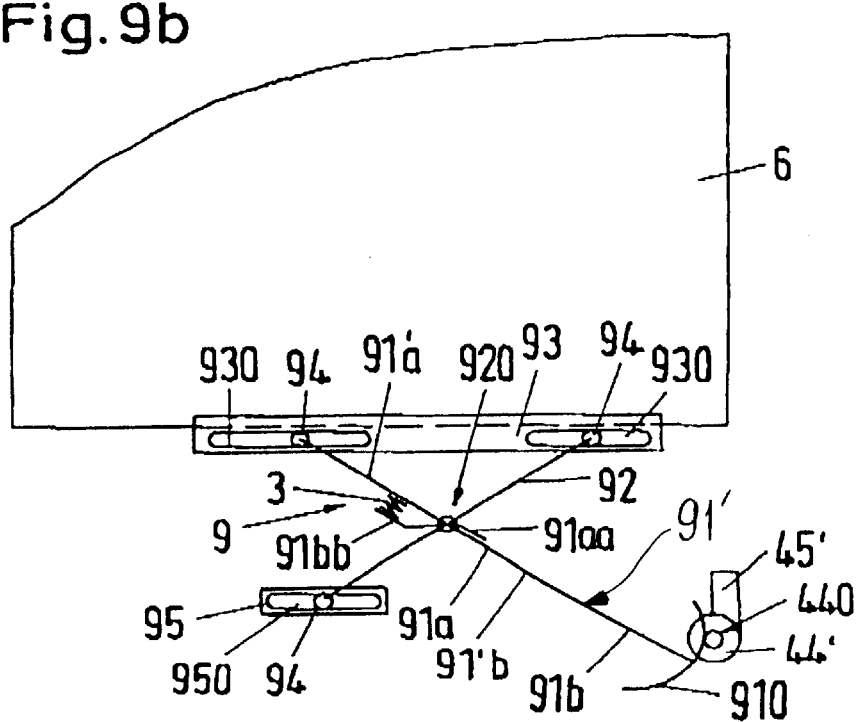

MOTOR-DRIVEN WINDOW LIFTER WITH ELECTRONIC ENTRAPMENT PROTECTION FOR A MOTOR VEHICLE

BACKGROUND OF THE INVENTION

This invention relates to a motor-driven window lifter with an electronic mechanism to protect against entrapment of body parts in the window opening. Its application is particularly advantageous for relatively rigidly configured displacement systems.

Due to the constantly increasing demands for the passive safety of motor vehicles, the stability of vehicle doors is being improved, for example, through the incorporation of additional efforts to dissipate forces from a side impact. This also has effects on the elasticity of displacement systems for window panes. With the loss of elasticity, the loads reaching the upper or lower stops of the window pane are increased, causing increased material wear as well as a larger danger of injury in the event of entrapment.

In principle, the elasticity of a displacement system can be increased by incorporation of a spring element into the line of force. U.S. Pat. No. 4,970,827 discloses a cable window lifter with a mounting rail attached to the bottom edge of the window pane. The rail carries the drive unit, which consists of an electric motor and gear with a multistage cable drum to wind up a plurality of cables. In addition, guide rollers are provided wherein a cable is guided between its first attachment point near the bottom edge of the window door channel and its second attachment point on the cable drum, for each of the outer regions of the mounting rail. A third cable, which is also connected with a region of the cable drum, is also attached by its other end near the bottom of the door with the interposition of a tension spring. If the cable drum is now rotated in the direction in which the two cables attached in the upper region of the door are shortened and to thus raise the window pane, the cable suspended below is unwound to the same extent and thus lengthened. In the opposing direction of rotation, the two upper cables lengthen and the window pane is lowered while the lower cable is shortened. The above-described tension spring serves to maintain a minimum tension in the window lifter displacement system. Upon reaching the upper stop of the window pane or in the event of the entrapment of a person, the spring cannot contribute to the relief of the displacement system since the section of the cable associated with it is unwound from the associated section of the cable drum during an upward movement of the window pane.

German Pat. No. DE 39 25 864 C2 describes a two-strand cable window lifter with one stop each on the carriers movably mounted on the guide rails. The stop, which first becomes active when the window pane reaches the closed position, is connected with a housing of the carrier, in which a spring is disposed. If the other carrier has not yet reached the closed position, an adequate length of cable for the distance still required is made available through compression of the spring.

The two-strand cable window lifter described is still capable during its use in a relatively stiff door construction upon entrapment of a hard object or body part (a head, for example) of providing the necessary "internal displacement distance" for the detection process, but with the disadvantage that the entrapping force will still increase significantly until the reversing of the window pane. The entire distance provided by the spring is associated with a constant increase in force, whereby the distance is traveled with decreasing speed. This results in a relative increase in the entrapment time, which in turn increases the risk for the degree of injuries; the pain subjectively experienced is also increased.

In German Patents DE 34 38 255 C1, DE 40 15 774 A1, and French Patent FR 2 584 469 A1, arrangements of elastically deformable elements at other points in the line of force of a cable window lifter are also known. However, these elements serve exclusively to attenuate a drive pulse from the drive or to keep the cable taut and to compensate for cable stretching. The solutions described are unsuitable for reducing the risk of injury to the extent necessary in cooperation with an entrapment protection arrangement for a comparatively rigid system.

SUMMARY OF THE INVENTION

A feature of an embodiment of the invention is a motor-driven window lifter with electronic entrapment protection for motor vehicles, which also ensures reliable entrapment detection even with comparatively rigid systems, whereby the entrapment force and the entrapment time are reduced in comparison with prior art technical solutions. Moreover, the invention should have a simple design and be usable independently of the design principle of the window lifter.

A motor-driven window lifter for raising a window pane and for protecting against entrapment of objects by the window pane in a window opening of a motor vehicle includes a drive path for raising the window pane and a spring is in a spring housing in the line of force along the drive path between the drive and the window pane. The spring being preloaded in the spring housing with a force corresponding to at least a displacement force thereon anticipated during raising of the window pane by a movement of the drive, and wherein a blocking force on the window pane corresponds at a maximum to a sum of the displacement force anticipated and an acceptable window pane entrapment force. A characteristic of the spring when a predetermined initial load on the spring is exceeded has a decreasing, negative curve, such that the spring reduces increased entrapment force with continued movement of the drive when the predetermined initial load on the spring is exceeded.

According to one embodiment of the present invention, a spring disposed between the motorized drive unit and the window pane in the line of force of a window lifter is used as a safety spring, and it has a decreasing characteristic, preferably a spring characteristic with a region with a negative force curve. The blocking force of the spring, i.e., the bearing pressure which the spring applies in using the maximum available deformation distance, should at most correspond to the sum of the force of displacement to be anticipated and an admissible entrapment force. This ensures that in the event of entrapment, this situation will be detected by evaluation electronics when the window lifter system is so rigidly designed that a (reverse) movement resulting from the elasticity of the system adequate to generate a signal is no longer guaranteed. Moreover, the decreasing or negative spring characteristic curve of the safety spring pretensioned with roughly the force of movement of the window ensures that in the event of entrapment the rise of the spring characteristic diminishes, whereby the entrapment force is reduced. At the same time, this results in reaching the point at which the collision situation is detectable by the sensors/electronics more quickly than in the prior art. This in turn yields a reduction in the entrapment time. On the whole, the risk of injury is thus reduced and the subjectively felt effect is less pronounced.

DESCRIPTION OF THE DRAWINGS

FIG. 3 is a schematic depiction of a single-strand cable window lifter with a springed guide roller.

FIG. 4 is a schematic depiction of a single-strand cable window lifter with a safety spring integrated into the carrier.

FIG. 5 is a schematic depiction of a two-strand cable window lifter with a safety spring integrated into the gear housing or into the cable output of the cable guide.

FIG. 7 is a cross-section through a drive stage with claw-like force transmission elements for a cable window lifter.

FIG. 8a shows details of a cross-section through the claw region with a preloaded safety spring before the initial load is exceeded.

FIG. 8b shows the cross-section of FIG. 8a, but after the initial load is exceeded.

FIG. 9a is a schematic depiction of a cross-arm window lifter with a lever arm divided on the axis of rotation of the drive lever.

FIG. 9b is a schematic depiction of a cross-arm window lifter with a lever arm divided in the cross-joint.

DETAILED DESCRIPTION OF THE INVENTION

Figure 1:
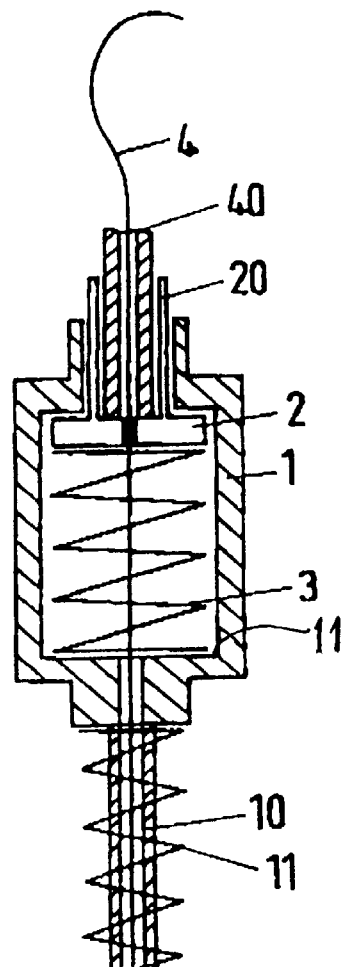
FIG. 1 is a schematic depiction of a housing with a safety spring with a decreasing spring characteristic and with a spring mounted on a guide bearing to compensate for lengthening of the cable.

Preferably, in the present invention a safety spring with a region with a negative spring characteristic curve should be used. That means that it has at least one region in which the spring force decreases with continued deformation of the spring. Such springs may be designed as leaf springs with a three-dimensional deformation region and are known by the name "click frog springs". Their spring characteristic curve initially rises monotonically until it reaches a maximum; with continued deformation, the spring force drops to a minimum, and then climbs again. This property leads, in the event of application of an external force, to the fact that a specific deformation path is suddenly followed when the maximum is exceeded. The deformation path is limited by a stop in this invention.

This invention uses the above effect. For this, the spring with the negative characteristic is designed such that its maximum spring force coincides roughly with the maximum anticipated force of displacement of the window pane. Its initial load, i.e. compression or tension, in the housing is likewise adjusted roughly to the maximum force of displacement, preferably to a value which is already somewhat beyond the maximum in the region of the negative curve of the spring characteristic. The blocking force as well (i.e., the spring force), which is obtained with maximum spring deformation (upon reaching the stop on the housing), should also be smaller than or equal to the force of displacement to be anticipated. Ideally, the blocking force lies in the negative region of the spring characteristic below the initial load. If the path of travel available to the spring in this region is inadequate to ensure entrapment detection, the blocking force may also be raised to a value where it reaches the force of displacement of the window pane.

The advantage of the preferred variant described above is that upon exceeding the maximum of the spring characteristic or upon reaching the initial load, the spring opens the entire path between the two housing stops without there being any increase in force in the displacement system. In the event that the blocking force lies in the minimum of the spring characteristic, there can be a significant reduction in the entrapment force even during the entrapment of an object and before the detection of this situation.

With the use of a spring with a decreasing spring characteristic, this spring characteristic should have a steeply rising initial region and a subsequent comparatively flatter region, whereby the initial load in the break region, or after it, should lie in the flatter region of the spring characteristic. With this type of spring, the above-described switch effect cannot occur, but in comparison to the prior art, there is a shortening of the entrapment time and a reduction in the entrapment force.

The present invention may be used regardless of the type of window lifter; the spring must merely be disposed between two force transmission elements in the line of force of the window lifter.

In cable window lifters, the cable outputs from the guide members, the gear housing or the carrier mounted on the guide rails present themselves as sites for incorporation of the safety springs according to the present invention. It is, of course, also conceivable to design a mounting point of a cable roller with restricted movement and spring loading such that the effective cable loop is shortened when a predefinable initial load is exceeded. In arm window lifters, it is possible to divide the drive lever at its mounting point on the base plate or in the cross joint (if a cross arm window lifter is provided) and to design the two arm sections rotationally limited relative to each other, whereby the region of rotation for forces operating in the closing direction is active, and the spring according to the present invention exerts a load on the arm parts of the drive lever with an initial load.

In addition, there is the possibility of disposing the safety spring in the region of the drive unit. If a claw-like engagement is provided between the drive gear element (e.g., a worm gear which meshes with the drive worm of an electric motor) and a drive gear element (e.g., a cable drum or a pinion for a toothed segment), the safety spring may also be disposed between these claws. Thus, the two gear elements are preloaded in the peripheral direction. In the dimensioning of the springs, the transmission conditions of the gears must be taken into account.

The embodiment of the invention depicted schematically in FIG. 1 and FIGS. 3–5 are intended for a Bowden casing window lifter, wherein the housing 1 is associated by its guide bearing 10 directly with a cable guide member 43 or with a cable output of gears 44 (see FIGS. 3–5 in this regard). In the interior of the housing 1 is a piston-like sliding element 2 with a bearing 20 formed on it, which serves to guide and to accommodate the end of a Bowden casing 40. Between the sliding element 2 on the one hand and the opposing housing wall, 1' on the other is a preloaded, i.e. precompressed, safety spring 3. It can have a decreasing spring characteristic and has at least one initial load, which corresponds to the force of displacement anticipated. In the specification of the force of displacement, no extreme conditions should be taken into account (for example, a frozen window pane), since otherwise the admissible entrapment force would be exceeded under normal conditions.

In the depicted position of the sliding element 2, i.e., with a stretched spring 3, the bearing force of the Bowden casing 40 is lower than the initial load of the spring 3. When the initial load is exceeded, the spring is compressed, which corresponds in effect to a shortening of the Bowden casing 40. Thus, the drive then has an adequate length of the cable 4 available, which creates as a "pseudo path" the prerequisite for signal generation and thus for detection of an entrapment situation when the window system must be considered virtually rigid.

All safety springs used in the figures are to be understood to be symbols for springs with decreasing or negative spring characteristic curves. They indicate no structural form.

Figure 2A:
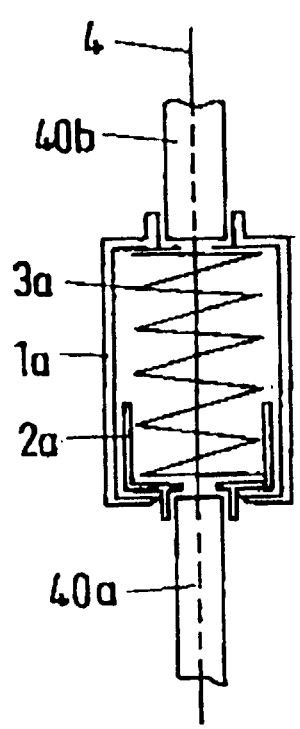
FIG. 2a is a schematic depiction of a housing with a safety spring with a negative spring characteristic before the initial load is exceeded.
Figure 2B:
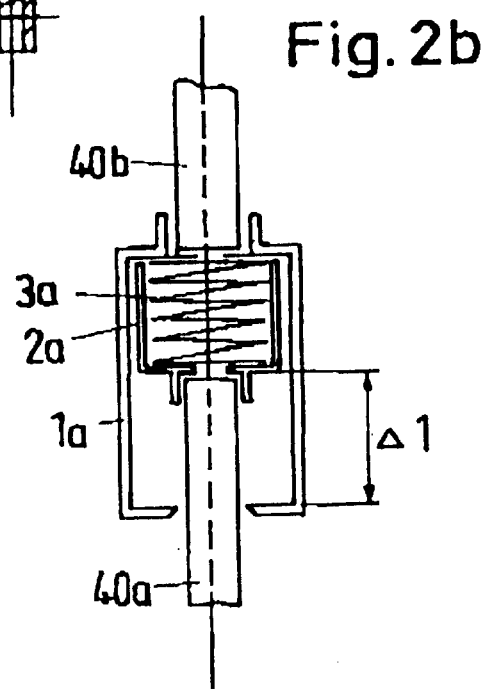
FIG. 2b shows the housing of FIG. 2a, but after the initial load is exceeded.

The embodiment depicted in FIGS. 2a and 2b is also intended for a Bowden casing window lifter and has a safety spring 3a disposed in the housing 1aa, which is supported on its end on the piston-like sliding element 2a. The Bowden casings 40a, 40b are inserted in the accommodating ends of the sliding element 2a or of the housing 1a.

The safety spring 3a with a spring characteristic with a negative force path curve is used, whereby the initial load in the region of the spring characteristic has a negative slope. The blocking force has been selected such that it is less than the initial load. The blocking force means the spring force which the safety spring 3a exerts under maximum deformation (i.e., after providing the maximum displacement path).

When the bearing force of the Bowden casing ends 40a, 40b exceeds the initial load, the sliding element 2a is instantly pushed against the opposite wall of the housing 2a. The displacement path corresponds to the cable length which can immediately be wound up by the drive unit. The compression of the spring 3a and thus its blocking force are determined by the height (axial expansion) of the cup-shaped sliding element 2a. The state depicted in FIG. 2a cannot be reached until the bearing pressure of the Bowden casing ends 40a, 40b drops below the initial load.

The above-described principles may be used in different window lifter types and at different locations for the purposes according to the present invention.

FIG. 3 schematically depicts the structure of a single-strand cable window lifter. It consists essentially of a drive path including a guide rail 42 with cable guides 43 on its ends and a drive consisting of a cable drum gear unit 44 and an electric motor 45. Continuing with the guide path, a closed cable loop 4, which is solidly connected to a carrier 5 movably mounted on the guide rail 42, is guided by the cable drum-gear unit 44 and the two cable guides 43. A window pane, such as 6 in FIG. 6, connected to carrier 5, is raised or lowered by the carrier 5 when cable loop 4 is driven. The arrow in FIG. 3 is intended to indicate that the upper cable guide 43 is movably mounted such that a positional change will result in a change in the effective length of the cable loop 4. A preloaded spring 3 in a housing 1b acts in the direction of movement of the cable guide 43. When there is an adequately great load on the cable, the spring 3 is compressed and opens an appropriate displacement path for the cable guide 43. This shortens the contact path of the cable loop 4 and the drive can wind up an additional section of cable, even though the carrier 5 and the window pane are not raised farther.

Figure 6:
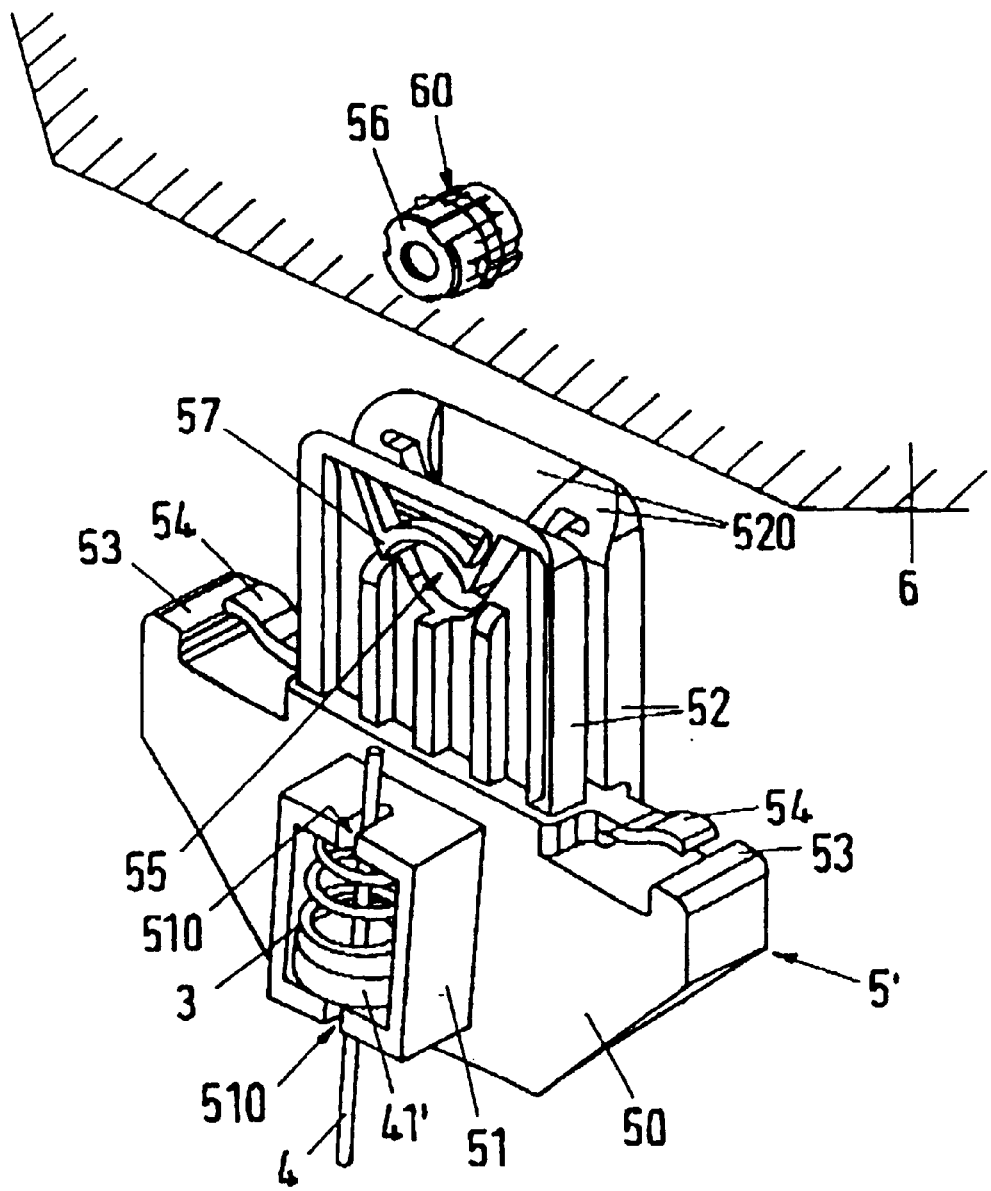
FIG. 6 is a perspective depiction of a carrier with a nipple chamber and safety spring installed on it.

FIG. 4 likewise schematically depicts a single-strand cable window lifter. It uses a special carrier 5' attached to a window such as 6 in FIG. 6, which forms a housing 1c to accommodate the safety spring 3 in the region of the nipple chamber. As shown in FIG. 6, the carrier 5' consists essentially of the main casting 50, the housing 51 laterally formed on it to accommodate the cable nipple 41' and the safety spring 3, as well as the retaining jaws 52 extending in the direction of movement. The retaining jaws 52 have a distance between them of roughly the thickness of the window pane 6 and have on their respective free ends an expansion element 57 with inside lead-in bevels 520 as well as a latching opening 55 to accommodate a latching element 56. The latching element 56 is inserted in a hole 60 in the window pane 6 and pushes the expansion elements 57 apart during insertions of the latching element 56 via the lead-in bevels 520 until the latching element has reached its latching opening 55. Then the expansion elements 57 surround and grip the top contour of the latching element 56 and secure the connection between the window pane 6 and the carrier 5'. In addition, window pane stops 53 to accommodate forces occurring in the direction of movement and spring elements 54 for compensation of play are provided on the carrier 5'.

The cable nipple 41' is designed as a support plate for the safety spring 3. It is solidly connected to the cable 4 which passes through the housing 51 through the slots 510. The other end of the preloaded safety spring 3 according to the invention is supported on the upper inside wall of the housing 51. The safety spring 3 depicted as a coil spring may also be replaced by a different design principle, preferably by a safety spring with a region with a negative characteristic curve A as shown in FIG. 10.

Figure 10:
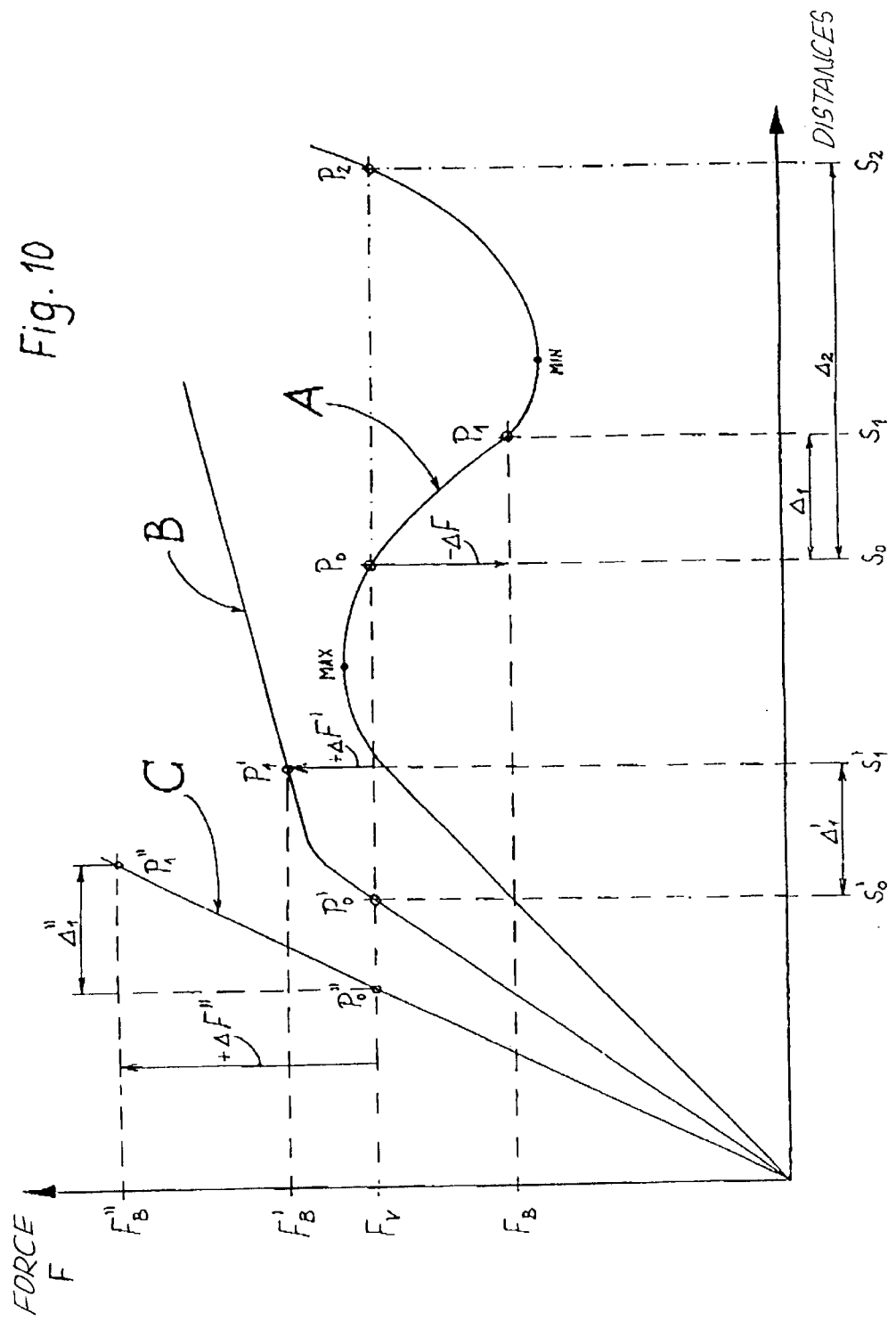
FIG. 10 is a depiction of various types of spring characteristics.

FIG. 10 presents various spring characteristic curves. The curve A represents the preferred curve for the invention, which initially has in the force path diagram an almost proportional rise, which moves near the maximum into a section of a higher order and then begins to fall monotonically, before being followed by another monotonically rising force path curve after passing through a minimum.

Ideally, with such a spring characteristic A, an initial load $F_V$ is selected in the point $P_0$, which lies after the maximum MAX in the region running negatively between MAX and MIN. The blocking force $F_B$ i.e., the spring force at the maximum admissible spring deformation, should also be in the region running negatively before reaching the minimum MIN. In this case, when the initial load is exceeded by the force of the cable on the carrier 5', the (symbolically depicted) safety springs 3 instantly change to the state of point $P_1$ with a blocking force $F_B$, which is less than the initial load $F_V$ by the value $\Delta F'$. That means that during the entrapment state, the entrapment force does not increase but rather decreases. Simultaneously, the spring path changes from $S_0$ to $S_1$ by the value $\Delta_1$. If the value $\Delta_1$ is insufficient to permit adequate movement of the drive for reliable sensing of the entrapment state, the point $P_1$ may be shifted to the point $P_2$, without an increase in the entrapment force compared to the starting state. The spring path available between $S_0$ and $S_2$ is now $\Delta_2$.

The initial load $F_V$ in the region point $P_0$ of the safety spring 3 is obtained from the sum of the anticipated displacement force (force of movement) at the site of the safety spring 3 and a safety force to be specified, which may not, however, exceed the admissible entrapment force.

The curve B in the diagram represents an example of a decreasing spring characteristic. Between the initial load $F_V$ at the point $P'_0$ and the blocking force $F'_B$ at the point $P'_1$, there is a breakpoint; after exceeding it, the force path curve becomes significantly flatter, such that the increase in force while passing through the necessary spring path remains limited to a relatively small value of $+\Delta F'$. However, it is more advantageous to adapt the course of the curve such that the flatter region of the curve of the spring characteristic line B already intersects the point $P'_0$, whereby the increase in force occurring during the entrapment state is reduced somewhat more.

Prior art coil springs generally have a spring characteristic C with a proportional curve. Providing the necessary reaction path with the value $\Delta''_1$, between the points $P''_0$ and $P''_1$ with the initial load $F_V$ or the blocking force $F''_B$ yields a significantly greater rise in force $\Delta F''$ during the entrapment process in comparison with the spring characteristics B and C.

There is an additional possibility of placing the safety spring according to the invention within the drive. The safety spring 3b can, for example, be disposed between the stops 72, 80 of gear elements connected to each other in claw fashion, as shown, for example, in FIGS. 7, 8a, and 8b.

Accordingly, the worm gear 7 has an outer ring 73 with teeth, in which a drive worm (not shown) engages. The outer ring is connected by base 74 with an internal ring 70 designed as a shaft, upon which a cable drum 8 with cable grooves 81 and a nipple chamber 82 is mounted. Spoke-like stops 72 rise from the base 74; between these stops are formed distributed spaces 71 in the direction of the periphery. The claws 80 of the cable drum 8 engage in these spaces 71.

FIGS. 8a and 8b depict cross-sections through the claw region of the gear elements described. According to FIG. 8a, a preloaded safety spring 3b presses on the one hand against the claw 80 partially sheathed with a rubber bumper 83 and on the other against the spoke-like stop 72. The initial load of the spring yields torque which is adequate to generate the anticipated force for movement of the window pane. If the initial load is exceeded, the spring 3b is compressed and there is a relative movement (rotational movement) between worm gear 7 and cable drum 8. The associated difference in the angle of rotation enables further rotation of the drive worm by at least one rotation, which is totally adequate for sensing the entrapment.

The present invention may also be used in conjunction with arm or manual window lifters. FIG. 9a schematically depicts a cross arm window lifter 9, whose lever arms 91, 92 are connected in a cross joint 920. The upper ends of the lever arms 91, 92 are equipped with sliders or rollers 94 and movably mounted in the sliding blocks 930 (or profiles) of the lifting rail 93 connected to the window pane 6. The lower end of the control arm 92 is guided on the sliding block 950 of the guide rail 95. A drive unit consisting of a gear 44' and 45' is provided to generate the displacing force; the pinion 440 of the drive unit engages with teeth (not shown) of a segment 910.

The drive lever consisting of two-parts 91a, 91b is mounted in the axis of rotation 900 on a base plate (not shown). The two arm parts 91a, 91b (of arm 91) are also mounted in this axis of rotation 900 on a door of a motor vehicle with limited rotatability relative to each other, whereby the angle of rotation is restricted by stop 91aa of the arm part 91a and stop 91bb of the arm part 91b. Whereas the stop 91aa is associated directly with the other arm part 91b as a counter stop, a preloaded safety spring 3 is braced between the stop 91bb and the arm part 91a.

The initial load of the safety spring 3 is selected such that it is not deformed with the occurrence of normal displacement forces. Only when the resistance of the window pane 6 to movement results in the fact that the initial load of the spring 3 is exceeded, is there a bending reaction of the drive lever in the axis of rotation 900. Thus, the drive 44', 45' can travel an additional distance, although the window pane 6 is no longer movable.

What is claimed is:

1. A motor-driven window lifter for protecting against entrapment of body parts in a window opening by a window pane of a motor vehicle, the motor-driven window lifter comprising:

a drive unit;

a window carrier connectable to the window pane; and at least one spring in a line of force in a drive path, between the drive unit and the window pane when the window pane is connected to the window carrier, the spring being preloaded in a housing with a force corresponding to at least a window displacement force anticipated during raising of the window carrier and wherein a blocking force of the spring corresponds at a maximum to a sum of the displacement force anticipated and a predetermined incremental admissible entrapment force and that a characteristic of the spring when an initial load thereon is exceeded has a decreasing spring characteristic curve, such that the spring characteristic curve becomes less positively inclined and the spring effectively enlarges the drive path between the drive unit and the window pane when the initial load is exceeded.

2. The motor-driven window lifter according to claim 1, wherein the initial load of the spring corresponds to the sum of the displacement force anticipated and an incremental safety force which is less than the predetermined incremental admissible entrapment force.

3. The motor-driven window lifter according to claim 1, wherein the spring curve has a negative force path curve region, and the initial load of the spring is greater than or equal to the displacement force anticipated and the blocking force is less than or equal to the displacement force anticipated.

4. The motor-driven window lifter according to claim 3, wherein the spring comprises a leaf spring with a three-dimensional deformation region.

5. The motor-driven window lifter according to claims 1, 2 or 3, wherein the lifter comprises an arm window lifter with at least one lever arm and wherein the spring is disposed in the line of force of the arm window lifter, and the lever arm is rotatably mountable in a door of a motor vehicle and is movably mounted with a first end on the window carrier, whereas a second end has an arcuate toothed segment with teeth which engage with opposing teeth of a gear element of the drive unit actuated by an outside force.

6. The motor-driven window lifter according to claim 5, wherein the toothed segment is connected to a first arm part and a second arm part of said at least one lever arm, the second arm part having with limited rotatability relative to the first arm part, and together form a two-part drive lever, whereby each rotational direction of the arm parts has first and second stops to restrict angles of rotation of the arm parts and the spring being mounted between the second stop and the first arm part.

7. The motor-driven window lifter according to claim 6, wherein an axis of rotation of the toothed segment is the same as an axis of rotation of the arm parts.

8. The motor-driven window lifter according to claim 6, wherein the arm parts are mounted in a cross joint with limited rotatability relative to each other.

9. The motor-driven window lifter according to claim 6, wherein the spring is disposed in a gear of the drive unit, between claws of a worm gear and one of a cable drum or a drive pinion, whereby the worm gear and one of the cable drum and the drive pinion are preloaded relative to each other by the spring with a predetermined torque.

10. The motor-driven window lifter of claim 1, wherein the lifter comprises a cable window lifter and wherein the spring is mounted in the housing and is disposed in the line of force of the cable window lifter with a closed cable loop, a cable drum, and at least two cable guide elements, the cable being guided by the at least two cable guide elements disposed along the displacement path of the window carrier and being wound on the cable drum coupled with the drive unit, the drive unit being actuable by an outside force, a section of the cable being guided vertically between the cable guide elements.

11. The motor-driven window lifter according to claim 10, further comprising means for compensating cable loop length.

12. The motor-driven window lifter according to claim 10, wherein the spring comprises a coil spring for cable length compensation, the coil spring being braced on a first end on the housing and on a second end, whereby the housing of the spring is movably mounted.

13. The motor-driven window lifter according to claim 10, further comprising a Bowden casing and wherein the spring is disposed between one end of the Bowden casing and one of an associated support of a housing for the drive unit or a cable output of one of said guide elements.

14. The motor-driven window lifter according to claim 10, wherein the spring is disposed in a nipple chamber of the carrier associated with the window pane, a stop surface on a first end of the cable nipple chamber and a second end of the cable nipple serves as support for the spring.

15. The motor-driven window lifter according to claim 10, wherein the drive path comprises a cable having a drive strand and the spring is inserted in line with the drive strand of the cable, and is loaded during closing of the window pane.

16. The motor-driven window lifter according to claim 1, wherein the decreasing spring characteristic curve is a negative spring characteristic curve.

17. A motor-driven window lifter for raising a window pane and for protecting against entrapment of objects by the window pane in a window opening of a motor vehicle comprising:

a window carrier connectable to the window pane;

a drive, in a drive path, for raising the window carrier; and a spring in a spring housing in a line of force along the drive path between the drive and the window pane when the window pane is connected to the window carrier, the spring being preloaded in the spring housing with a force corresponding to at least a displacement force thereon anticipated during raising of the window pane by a movement of the drive, and wherein a blocking force on the window pane corresponds at a maximum to a sum of the displacement force anticipated and an incremental acceptable window pane entrapment force, and that a characteristic of the spring when a predetermined initial load on the spring is exceeded has a decreasing spring characteristic curve, such that the spring characteristic curve becomes less positively inclined and the spring reduces the rate of increased entrapment force with continued movement of the drive when the predetermined initial load on the spring is exceeded.

* * * * *